US010198092B2

(12) United States Patent
Park et al.

(10) Patent No.: US 10,198,092 B2
(45) Date of Patent: Feb. 5, 2019

(54) ELECTRONIC DEVICE INCLUDING ELECTRONIC PEN AND METHOD FOR RECOGNIZING INSERTION OF THE ELECTRONIC PEN THEREIN

(71) Applicant: Samsung Electronics Co., Ltd., Gyeonggi-do (KR)

(72) Inventors: Myeong Sil Park, Gyeonggi-do (KR); Joohoon Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/665,650

(22) Filed: Aug. 1, 2017

(65) Prior Publication Data

US 2018/0032163 A1 Feb. 1, 2018

(30) Foreign Application Priority Data

Aug. 1, 2016 (KR) .......................... 10-2016-0097739

(51) Int. Cl.
*G06F 3/0354* (2013.01)
*B43K 24/02* (2006.01)
*G06F 3/041* (2006.01)
*G06F 3/044* (2006.01)
*G06F 3/046* (2006.01)
*G06F 1/16* (2006.01)

(52) U.S. Cl.
CPC .......... *G06F 3/03545* (2013.01); *B43K 24/02* (2013.01); *G06F 1/1626* (2013.01); *G06F 3/044* (2013.01); *G06F 3/046* (2013.01); *G06F 3/0416* (2013.01)

(58) Field of Classification Search
None
See application file for complete search history.

(56) References Cited

U.S. PATENT DOCUMENTS

2011/0012849 A1* 1/2011 Cho .................. G06F 1/1626
345/173
2014/0062948 A1* 3/2014 Lee .................. G06F 3/0418
345/174

(Continued)

FOREIGN PATENT DOCUMENTS

JP 2003-186577 A 7/2003
JP 2013-25665 A 2/2013

(Continued)

OTHER PUBLICATIONS

International Search Report dated Nov. 15, 2017.

*Primary Examiner* — Nicholas Lee
(74) *Attorney, Agent, or Firm* — Cha & Reiter, LLC.

(57) ABSTRACT

According to various exemplary embodiments, there may be provided an electronic device including a housing having a first side and an opposite second side, a display disposed between the first side and the second side, an ElectroMagnetic Resonance (EMR) sensor pad disposed between the display and the second side, a pen placing space disposed between the first side and the second side to accommodate an electronic pen, and a detecting member disposed in vicinity of the electronic pen for detecting the electronic pen when the electronic pen is fully inserted into the pen placing space.

19 Claims, 14 Drawing Sheets

(56) References Cited

U.S. PATENT DOCUMENTS

2014/0306909 A1   10/2014  Pedersen et al.
2015/0331451 A1*  11/2015  Shin ........................ G06F 3/041
     345/173
2016/0109968 A1*   4/2016  Roh .................... G06F 3/03545
     345/173

FOREIGN PATENT DOCUMENTS

| | | |
|---|---|---|
| KR | 10-2004-0034197 A | 4/2004 |
| KR | 10-2014-0065048 A | 5/2014 |
| KR | 10-2016-0046668 A | 4/2016 |

* cited by examiner

ELECTRONIC DEVICE INCLUDING ELECTRONIC PEN AND METHOD FOR RECOGNIZING INSERTION OF THE ELECTRONIC PEN THEREIN

CLAIM OF PRIORITY

This application claims the benefit under 35 U.S.C. § 119(a) of a Korean patent application filed in the Korean Intellectual Property Office on Aug. 1, 2016 and assigned Serial No. 10-2016-0097739, the entire disclosure of which is hereby incorporated by reference.

BACKGROUND

1. Field of the Disclosure

Various exemplary embodiments of the present disclosure generally relate to an electronic device having an electronic pen and a method for recognizing detachment of the electronic pen from the electronic device.

2. Description of the Related Art

An electronic device may have a touch-type display module, and may have a high-definition camera module, which allows the device to capture still images and moving images. The electronic device also allows for communication, e.g. phone calls between the user of the terminal and another peer user. Further, the electronic device can reproduce multimedia content such as music, video, or the like, and can access data network such as the Internet. Since the processing power of the electronic device has gradually increased, these various functions of the device can be more rapidly executed.

The electronic device may also use an electronic pen as a secondary input device for using the various functions, the primary input device, for example, may be fingers of the user.

SUMMARY

According to one or more exemplary embodiments, an electronic device may be provided where the electronic pen can be stored in a space within the electronic device adapted to accommodate the electronic pen. When the user requires the electronic pen, he or she may detach the electronic pen from the electronic device.

According to one or more exemplary embodiments, the electronic device may detect whether the electronic pen is inserted into the space of the electronic device. According to one exemplary embodiment, the electronic device may include a separate detecting member capable of detecting whether the electronic pen is inserted into the electronic device. The detecting member may include detecting member may include a hall sensor provided in the electronic pen to detect magnetic force of a magnet or a switching device (e.g., a tack switch) mechanically movable by being disposed inside a detaching space of the electronic pen to perform a switching operation.

However, such a configuration may be bulky and undesirable because it take up too much space within the electronic device. In order to design the electronic device to be as compact as possible, slimmer sensors for detecting insertion of the electronic pen are required.

According to various exemplary embodiments of the present disclosure, there may be provided an electronic device having an electronic pen and a method for recognizing an insertion of the electronic pen.

According to various exemplary embodiments of the present disclosure, there may be provided an electronic device having an electronic pen, and a method of recognizing an insertion of the electronic pen, where the sensor for detecting the insertion of the pen is slim and compact.

According to various exemplary embodiments of the present disclosure, there may be provided an electronic device having an electronic pen implemented to improve usage efficiency of the electronic device by minimizing power consumption for recognizing an insertion of the electronic pen, and a method for recognizing the insertion of the electronic pen.

According to various exemplary embodiments, an electronic device may include a housing having a first side and an opposite second side, a display disposed between the first side and the second side, an ElectroMagnetic Resonance (EMR) sensor pad disposed between the display and the second side, a pen placing space disposed between the first side and the second side to accommodate an electronic pen, and a detecting member disposed in vicinity of the electronic pen for detecting the electronic pen when the electronic pen is fully inserted into the pen placing space.

According to various exemplary embodiments, a method for recognizing an insertion of an electronic pen into an electronic device having a detecting member for detecting a signal at a resonance frequency from a coil provided in the electronic pen may include detecting whether a data input operation of the electronic pen is stopped, when the data input operation of the electronic pen is stopped, operating the detecting member, detecting the insertion of the electronic pen by the detecting member, when the insertion of the electronic pen is detected, stopping operation of an ElectroMagnetic Resonance (EMR) sensor pad configured to detect the data input operation of the electronic pen, detecting a removal of the electronic pen from the electronic device by the detecting member, and when the removal of the electronic pen is detected, operating the EMR sensor pad again.

DETAILED DESCRIPTION

Figure 1:
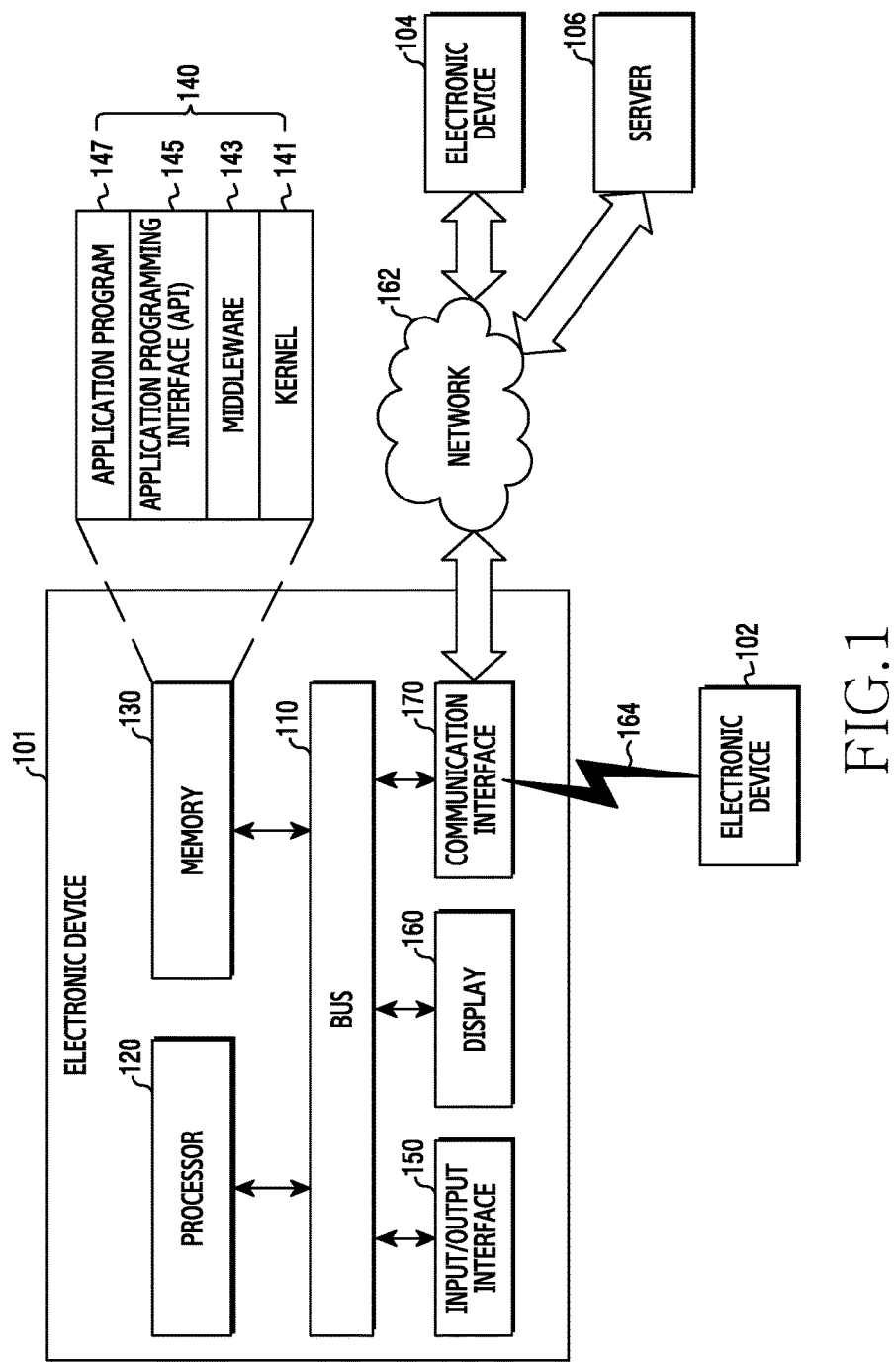
FIG. 1 is a block diagram of a network environment including an electronic device according to one exemplary embodiment of the present disclosure.

Embodiments of the present disclosure will be described herein below with reference to the accompanying drawings. However, the embodiments of the present disclosure are not limited to the specific embodiments disclosed herein and should be construed as including all modifications, changes, equivalents, and/or alternatives to the various embodiments disclosed herein.

The terms and words used in the following description are used to enable a clear and consistent understanding of the present disclosure. Accordingly, it should be apparent to those skilled in the art that the following description of the embodiments is provided for illustrative purposes only and not for the purpose of limiting the present disclosure as defined by the appended claims and their equivalents.

Singular form of terms indicated by "a," "an," and "the" may also include the plural form of the terms unless the context clearly dictates otherwise. Thus, for example, "a component surface" may refer to one or more of such surfaces.

The embodiments described herein are by way of illustration only and should not be construed in any way to limit the scope of the disclosure. For example, those skilled in the art will understand that the principles of the present disclosure may be implemented in any suitable electronic device.

As used herein, the term "substantially" means that the recited characteristic, parameter, or value need not be achieved exactly, but that variations such as tolerances, measurement errors, measurement accuracy limitations and other factors known to those of skill in the art, may occur in amounts that do not preclude the effect the characteristic was intended to provide.

The terms "have," "may have," "include," and "may include" as used herein to indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may refer to various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

When an element (for example, a first element) is "(operatively or communicatively) coupled with/to" or "connected to" another element (for example, a second element), the element may be directly coupled with/to the other element, or there may be an intervening element (for example, a third element) between the element and the other element. To the contrary, when an element (for example, a first element) is "directly coupled with/to" or "directly connected to" another element (for example, a second element), there is no intervening element (for example, a third element) between the element and the other element.

The term "module" as used herein may refer to a unit including one of hardware, software, and firmware, or a combination thereof. The term "module" may be interchangeably used with terms such as unit, logic, logical block, component, or circuit. A module may be mechanically or electrically implemented. For example, a module may include at least one of an application-specific integrated circuit (ASIC) chip, field-programmable gate arrays (FPGAs), and a programmable-logic device, which are known or will be developed and which perform certain operations.

All of the terms used herein including technical or scientific terms have the same meanings as those generally understood by an ordinary skilled person in the art unless they are defined otherwise. The terms, which are defined in dictionaries, should be interpreted according to their customary meanings in the relevant art and not be interpreted in a non-customary manner unless expressly so defined in the disclosure. In some cases, even if certain terms are expressly defined in this disclosure, they should not be interpreted to exclude embodiments of the present disclosure.

Electronic devices according to the embodiments of the present disclosure may be, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may be accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may be, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may be various medical devices (e.g., various portable medical measurement devices (such as blood glucose meters, heart rate monitors, blood pressure monitors, or thermometers, and the like), magnetic resonance angiography (MRA) devices, magnetic resonance imaging (MRI) devices, computed tomography (CT) devices, scanners, ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further be parts of furniture or buildings/structures, electronic boards, electronic signature receiving devices, projectors, or various measuring instruments (such as water meters, electricity meters, gas meters, wave meters, and the like). The electronic devices may be one or more combinations of the above-mentioned devices. The electronic devices may be flexible electronic devices. Also, the electronic devices are not limited to the above-mentioned devices, and may be, without departing from the spirit of the disclosure, new electronic devices developed in the art. Hereinafter, the electronic devices according to the various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a block diagram of a network environment including an electronic device according to one embodiment of the present disclosure.

Referring to FIG. 1, a network environment 162 includes an electronic device 101, which includes a bus 110, a processor 120, a memory 130, an input/output interface 150, a display 160, and a communication interface 170. The electronic device 101 can omit at least one of the components or further include another component.

The bus 110 includes a circuit for connecting the components and delivering communications such as a control message therebetween.

The processor 120 may be one or more of a central processing units (CPUs), an application processor (AP), and a communication processor (CP). The processor 120 processes an operation or data on control of and/or communication with another component of the electronic device 101. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The processor 120, which can control the communication interface 170 to connect to a long term evolution (LTE) network, determines whether a call is connected over a circuit switched (CS) service network, such as a 2nd generation (2G) or 3rd generation (3G) network, using caller identification information, such as the caller phone number. For example, the processor 120 receives incoming call information, such as a CS notification message or a paging request message of the CS service network over the LTE network. The paging request message may be a circuit-switched fallback (CSFB) message. The processor 120 may receive the incoming call information using single radio LTE (SRLTE).

After receiving an incoming CS notification message or a paging request message of the CS service network over the LTE network, the processor 120 may obtain caller identification information from the incoming call information. The processor 120 displays the caller identification information on the display 160. The processor 120 determines whether to connect the call based on input information corresponding to the caller identification information displayed on the display 160. For example, after detecting input information corresponding to an incoming call rejection through the input/output interface 150, the processor 120 rejects the voice call connection and maintains the LTE network connection. As another example, after detecting input information corresponding to an incoming call acceptance through the input/output interface 150, the processor 120 connects the voice call by connecting to the CS service network.

In another embodiment, after obtaining the caller identification information, the processor 120 determines whether to connect the call by comparing the caller identification information with a reception control list. For example, when the caller identification information is included in a first reception control list, such as a blacklist, the processor 120 rejects the voice call connection and maintains the connection to the LTE network. However, when the caller identification information is not included in the blacklist, the processor 120 connects the voice call by connecting to the CS service network. Similarly, when the caller identification information is included in a second reception control list, such as a white list, the processor 120 connects the voice call by connecting to the CS service network.

In yet another embodiment, after receiving the incoming call information, such as a paging request message of the CS service network over the LTE network, the processor 120 sends an incoming call response message, such as a paging response message, to the CS service network. The processor 120 then suspends the LTE service and receives the caller identification information, such as a circuit-switched call (CC) setup message, from the CS service network. The processor 120 determines whether to connect the call by comparing the caller identification information with the reception control list. For example, when the caller identification information is included in the blacklist, the processor 120 rejects the voice call connection and resumes the LTE network connection. When the caller identification information is not included in the he blacklist, the processor 120 connects the voice call by connecting to the CS service network. Or alternatively, when the caller identification information is included in the white list, the processor 120 connects the voice call by connecting to the CS service network.

The memory 130 can be a volatile and/or nonvolatile memory. The memory 130 stores commands or data, such as the reception control list relating to at least another component of the electronic device 101. The memory 130 may store software and/or a program 140. The program 140 includes kernel 141, middleware 143, application programming interface (API) 145, and/or application programs (or applications) 147. At least some of the kernel 141, the middleware 143, and the API 145 may be referred to as an operating system (OS).

The kernel 141 controls or manages system resources, such as the bus 110, the processor 120, or the memory 130 used for performing an operation or function implemented by the other programs, such as the middleware 143, the API 145, or the applications 147. Furthermore, the kernel 141 provides an interface through which the middleware 143, the API 145, or the applications 147 connects the individual elements of the electronic device 101 to control or manage the system resources.

The middleware 143 functions as an intermediary for allowing the API 145 or the applications 147 to communicate with the kernel 141 to exchange data.

In addition, the middleware 143 processes one or more task requests received from the applications 147 according to priorities thereof. For example, the middleware 143 assigns priorities for using the system resources of the electronic device 101, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function, such as an instruction for file control, window control, image processing, or text control.

The input/output interface 150 functions as an interface that transfers instructions or data input from a user or another external device to the other element(s) of the electronic device 101. Furthermore, the input/output interface 150 outputs the instructions or data received from the other element(s) of the electronic device 101 to the user or an external electronic device.

The display 160 may be a liquid crystal display (LCD), a light emitting diode (LED) display, an organic LED (OLED) display, a micro electro mechanical system (MEMS) display, an electronic paper display, etc. The display 160 displays various types of content, such as text, images, videos, icons, or symbols for the user. The display 160 may include a touch screen and receive, for example, touch, gesture, proximity, hovering inputs, etc., using an electronic pen or the user's body part (e.g., a finger of the user). The display 160 may display a web page.

The communication interface 170 can establish a communication between the electronic device 101 and an external electronic device, such as a first external electronic device 102, a second external electronic device 104, or a server 106. For example, the communication interface 170 can communicate with the first external electronic device 102, the second external electronic device 104, or the server 106 in connection to the network 162 through wireless communication or wired communication or via a short-range communication 164. For example, the wireless communication can conform to a cellular communication protocol including at least one of LTE, LTE-advanced (LTE-A), code division multiple access (CDMA), wideband CDMA (WCDMA), universal mobile telecommunication system (UMTS), wireless broadband (WiBro), and global system for mobile communications (GSM).

The wired communication can include at least one of a universal serial bus (USB), a high definition multimedia interface (HDMI), a recommended standard 232 (RS-232), and a plain old telephone service (POTS).

The network 162 can be a telecommunications network, for example, a computer network such as local area network (LAN) or wide area network (WAN), the Internet, and a telephone network.

The electronic device 101 provides LTE service in the single radio environment by use of at least one module functionally or physically separated from the processor 120.

Each of the first and second external electronic devices 102 and 104 may be same as or different from the electronic device 101. The server 106 may include a group of one or more servers. All or some of the operations to be executed by the electronic device 101 may be executed by the external electronic devices 102 and 104 or the server 106. When the electronic device 101 performs a certain function or service automatically or by request, the electronic device 101 may request some functions that are associated therewith from another electronic device instead of or in addition to executing the function or service by itself. The external electronic devices 102 and 104 or the server 106 may execute the requested functions, and may transmit the results to the electronic device 101. The electronic device 101 may provide the requested functions or services by processing the received results. For example, a cloud computing technique, a distributed computing technique, or a client-server computing technique may be used.

Figure 2:
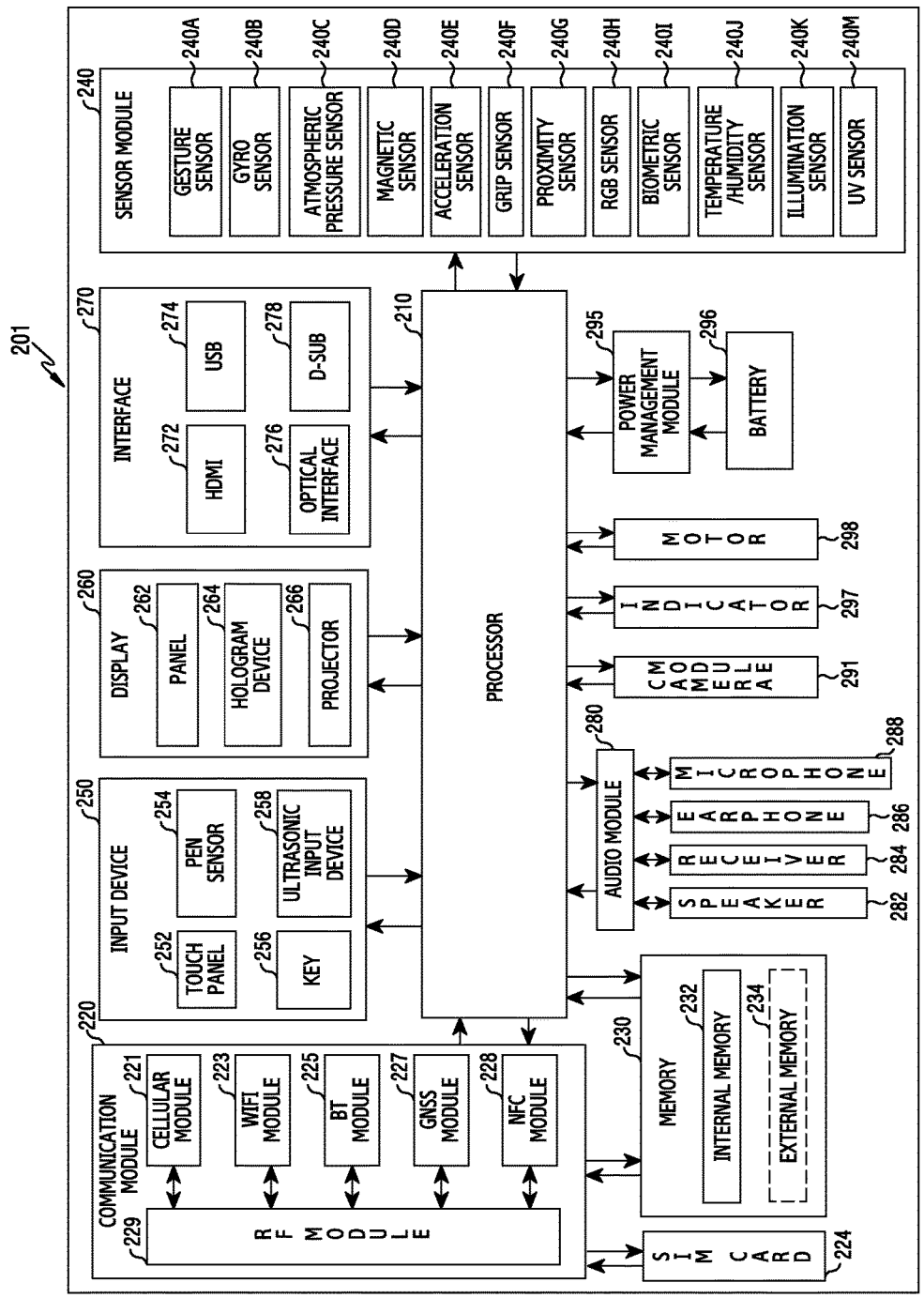
FIG. 2 is a block diagram of an electronic device according to one exemplary embodiment of the present disclosure.

FIG. 2 is a block diagram of an electronic device according to an embodiment of the present disclosure.

Referring to FIG. 2, the electronic device 201 includes at least one processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls a plurality of hardware or software elements connected to the AP 210 by driving an OS or an application program. The AP 210 processes a variety of data, including multimedia data, performs arithmetic operations, may be implemented with a system on chip (SoC) and may further include a graphical processing unit (GPU).

The communication module 220 performs data transmission/reception in communication between the external electronic devices 102, 104 or the server 106 which may be connected with the electronic device 201 through the network 162. The communication module 220 includes a cellular module 221, a wireless-fidelity (Wi-Fi) module 223, a Bluetooth® (BT) module 225, a global navigation satellite system (GNSS) or GPS module 227, a near field communication (NFC) module 228, and a radio frequency (RF) module 229.

The cellular module 221 provides voice call, video call, text service, or Internet service, such as through a LTE, LTE-A, CDMA, WCDMA, UMTS, WiBro, or GSM communication network, for example. In addition, the cellular module 221 identifies and authenticates the electronic device 201 within the communication network by using the SIM card 224. The cellular module 221 may perform at least some of the functions that can be provided by the AP 210. For example, the cellular module 221 may perform multimedia control functions.

The cellular module 221 may further include a CP. Further, the cellular module 221 may be implemented, for example, with an SoC. Although elements, such as the cellular module 221, the memory 230, and the power management module 295 are illustrated as separate elements with respect to the AP 210 in FIG. 2, the AP 210 may also be implemented such that at least one component, for example the cellular module 221, is included in the AP 210.

The AP 210 or the cellular module 221 loads instructions or data, which are received from non-volatile memory connected thereto, to volatile memory and processes the instructions or data. In addition, the AP 210 or the cellular module 221 stores data, which is received from the other elements or generated by the other elements, into the non-volatile memory.

Each of the Wi-Fi module 223, the BT module 225, the GNSS module 227, and the NFC module 228 includes a processor for processing data transmitted/received through the corresponding module. Although the cellular module 221, the Wi-Fi module 223, the BT module 225, the GNSS module 227, and the NFC module 228 are illustrated in FIG. 2 as separate blocks, at least two of the cellular module 221, the Wi-Fi module 223, the BT module 225, the GNSS module 227, and the NFC module 228 may be included in one integrated chip (IC) or IC package. For example, at least some of processors corresponding to the cellular module 221, the Wi-Fi module 223, the BT module 225, the GNSS module 227, and the NFC module 228, such as a communication processor corresponding to the cellular module 221 and a Wi-Fi processor corresponding to the Wi-Fi module 223, may be implemented with an SoC.

The RF module 229 transmits/receives data, such as an RF signal, and may include a transceiver, a power amp module (PAM), a frequency filter, or a low noise amplifier (LNA), for example. In addition, the RF module 229 may further include a component for transmitting/receiving radio waves, such as a conductor or a conducting wire. The cellular module 221, the Wi-Fi module 223, the BT module 225, the GNSS module 227, and the NFC module 228 may share one RF module 229, and at least one of these modules may transmit/receive RF signals via a separate RF module.

The SIM card 224 may be inserted into a slot formed at a specific location of the electronic device 201. The SIM card 224 includes unique identification information, such as an integrated circuit card identifier (ICCID) or subscriber information, such as an international mobile subscriber identity (IMSI).

The memory 230 includes an internal memory 232 or an external memory 234.

The internal memory 232 may be a volatile memory, such as a dynamic random access memory (DRAM), a static RAM (SRAM), or a synchronous dynamic RAM (SDRAM) or a non-volatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory. The internal memory 232 may be a solid state drive (SSD).

The external memory 234 may be a flash drive, a compact flash (CF), secure digital (SD), micro-SD, mini-SD, extreme digital (xD), and a memory stick, and may be operatively coupled to the electronic device 201 via various interfaces.

The electronic device 201 may further include a storage unit or a storage medium such as a hard drive.

The sensor module 240 measures a physical quantity or detects an operation state of the electronic device 201, and converts the measured or detected information into an electric signal. The sensor module 240 includes, for example, at least one of a gesture sensor 240A, a gyro sensor 240B, a barometric pressure sensor or air sensor 240C, a magnetic sensor 240D, an acceleration sensor 240E, a grip sensor 240F, a proximity sensor 240G a color sensor 240H, such as a red, green, blue (RGB) sensor, a biometric sensor 240I, a temperature/humidity sensor 240J, an illumination/illuminance sensor 240K and an ultraviolet (UV) sensor 240M.

Additionally or alternatively, the sensor module 240 may include, for example, an E-node sensor, an electromyography (EMG) sensor, an electroencephalogram (EEG) sensor, an electrocardiogram (ECG) sensor, and a fingerprint sensor.

The sensor module 240 may further include a control circuit for controlling at least one or more sensors included therein.

The input device 250 includes a touch panel 252, a (digital) pen sensor 254, a key 256, or an ultrasonic input unit 258.

The touch panel 252 recognizes touch inputs by using electrostatic, pressure-sensing, ultrasonic, resistive, and/or infrared methods. The touch panel 252 may further include a control circuit. In the instance where the touch panel detects touch using electrostatic methods, both physical contact recognition and proximity recognition are possible. The touch panel 252 may further include a tactile layer, which provides the user with tactile feedback.

The (digital) pen sensor 254 may include a recognition sheet which can be a part of the touch panel or can be separately implemented from the touch panel. The key 256 may include a physical button, an optical key, or a keypad. The ultrasonic input device 258 may detect ultrasonic waves generated by an input tool through a microphone 288, and may generate data corresponding to the detected ultrasonic waves.

According to one exemplary embodiment, the pen sensor 254 may include an ElectroMagnetic Resonance (EMR) sensor for detecting whether there is an input of an electronic pen. According to one exemplary embodiment, the processor may use an electromagnetic field generated by the EMR sensor to detect the location of the electronic pen. This is accomplished by the processor receiving a feedback signal at a resonance frequency of a coil provided in the electronic pen. According to one exemplary embodiment, the processor may include a control circuit (a driver IC) for the EMR sensor.

The display 260 may include a panel 262, a hologram 264, or a projector 266.

The panel 262 may be an LCD or an AM-OLED panel, for example. The panel 262 may be implemented in a flexible, transparent, or wearable manner, and may be constructed as one module with the touch panel 252.

The hologram device 264 uses interference of light to display stereoscopic images in the air above the hologram device 264.

The projector 266 displays images by projecting light beams onto a screen. The screen may be a component of the electronic device 201 or may be an external component.

The display 260 may further include a control circuit for controlling the panel 262, the hologram device 264, or the projector 266.

The interface 270 may include the HDMI 272, the USB 274, the optical communication interface 276, or the d-sub-miniature (D-sub) 278 interface. The interface 270 may be included, for example, in the communication interface 170 of FIG. 1, and may include a mobile high-definition link (MHL), SD/multi-media card (MMC) or infrared data association (IrDA) interface.

The audio module 280 may converts sound to electric signals or vice versa. At least some elements of the audio module 280 may be included in the input/output interface 150 of FIG. 1. The audio module 280 converts sound information which is input or output through the speaker 282, the receiver 284, the earphone 286, or the microphone 288.

The speaker 282 may output a signal at an audible frequency band and a signal at an ultrasonic frequency band. Reflected waves of the ultrasonic signal emitted from the speaker 282 and an external audible signal may be received.

The camera module 291 is a device for image and video capturing, and may include one or more image sensors, such as a front sensor or a rear sensor, lenses, an image signal processor (ISP), or a flash, such as an LED or a xenon lamp. In certain instances, it may prove advantageous to include two or more camera modules.

The power management module 295 manages power of the electronic device 201. The power management module 295 may include a power management integrated circuit (PMIC), a charger IC, or a battery gauge.

The PMIC may be placed inside an IC or an SoC and may use wired or wireless charging to charge the battery 296. The charger IC can charge the battery 296 and can prevent over-voltage or over-current flow to the battery 296.

Different types of wireless charging may include, for example, magnetic resonance type, magnetic induction type, or electromagnetic type. Additional circuits for the wireless charging, such as coil loops, resonant circuits, or rectifiers may be added.

The battery gauge may measure the residual quantity of power in the battery 296 and the voltage, current, and temperature during charging. The battery 296 stores electricity and supplies power to the electronic device 201. The battery 296 may be a rechargeable battery or a solar battery.

The indicator 297 indicates a specific state of the electronic device 201 or a part thereof, such as the AP 210. The states may be states when the electronic device 201 is booting, transmitting/receiving a message, charging, etc.

The motor 298 converts an electric signal into a mechanical vibration.

The electronic device 201 includes a processing unit, such as a GPU, for supporting mobile TV which processes media data according to a protocol of, for example, digital multimedia broadcasting (DMB), digital video broadcasting (DVB), or media flow.

Each of the aforementioned elements of the electronic device 201 may consist of one or more components, and names thereof may vary depending on a type of the electronic device 201. The electronic device 201 may include at least one of the aforementioned elements. Some of the elements may be omitted, or additional other elements may be further included. In addition, some of the elements of the electronic device 201 may be combined and constructed as one entity, so as to equally perform functions of corresponding elements before combination.

At least some parts of the electronic device 201, such as modules or functions thereof, or operations, may be implemented with instructions stored in a non-transitory computer-readable storage media for example. The instructions may be executed by the processor 210, to perform functions corresponding to the instructions. The non-transitory computer-readable storage media may be the memory 230. At least some parts of the programming module may be executed by the processor 210. At least some parts of the programming module may include modules, programs, routines, and a set of instructions for performing one or more functions.

Figure 3A:
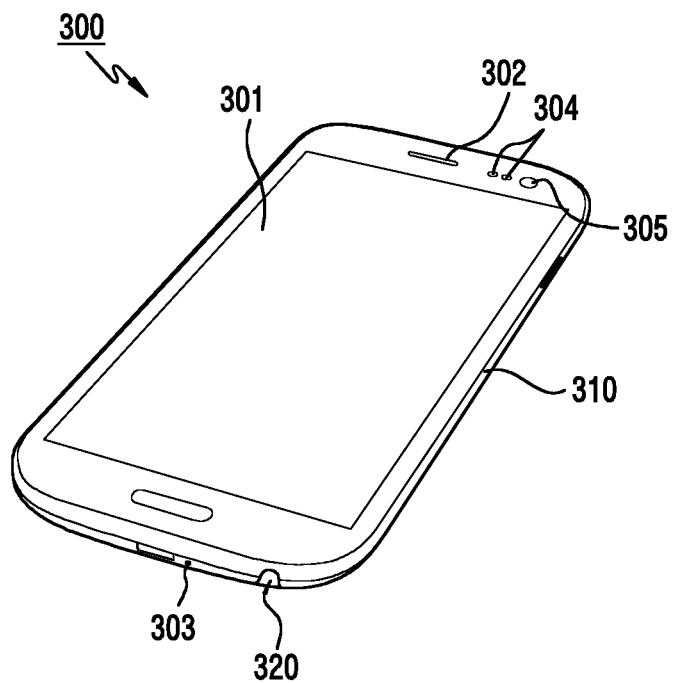
FIG. 3A and FIG. 3B are perspective views of an electronic device that includes a detachable electronic pen according to one exemplary embodiment of the present disclosure.
Figure 3B:
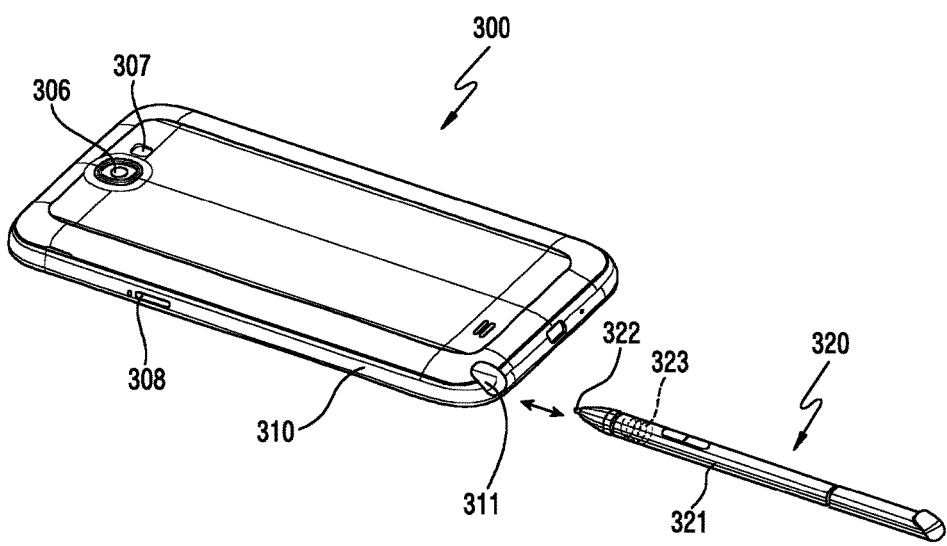

FIG. 3A and FIG. 3B are perspective views of an electronic device that includes a detachable electronic pen according to one exemplary embodiment of the present disclosure.

Referring to FIG. 3A and FIG. 3B, a display 301 may be disposed on the front of the housing 310 of the electronic device 300. A speaker device 302 may be installed above the display 301 to, for example, output voice of a counterparty when the user accepts a phone call. A microphone device 303 may be installed below the display 301 to, for example, transmit the voice of the user to the counterparty during the call. According to one exemplary embodiment, the display 301 may be a touch screen device that includes a touch sensor. According to another exemplary embodiment, the display may be a pressure responsive touch screen device that includes a touch sensor and a force sensor responsive to touch pressure.

In one embodiment, components for performing various functions of the electronic device 300 may be disposed around the speaker device 302. The components may include the sensor module 304. The sensor module 304 may include, for example, at least one of an illumination sensor (e.g., an optical sensor), a proximity sensor, an infrared sensor, and an ultrasonic sensor. The components may also include a front camera device 305 and an indicator for informing the user of the status of the electronic device 300. According to one exemplary embodiment, additional components may also be disposed on the rear of the electronic device 300. These additional components may include at least one of a second camera device 306, various sensor modules (e.g., a heart rate sensor, an illuminance sensor, an ultrasonic sensor, etc.), and an illumination device 307. According to one exemplary embodiment, a physical key button 308 (e.g., a side key button) may be disposed on the lateral side of the electronic device and may protrude from the lateral side.

According to one exemplary embodiment, the electronic device 300 may include an electronic pen 320 that, when not in use, can be stored in the pen placing space 311 formed in the housing 310. According to one exemplary embodiment, the electronic pen 320 may include a coil 323 inside the hollow pen housing 321. The coil 323 may be electrically connected to a substrate (not shown). According to one exemplary embodiment, the tip 322 may be disposed on an end portion of the pen housing 321 so that to enable pen input when the electronic pen 320 is used in conjunction with the pen sensor 254.

According to one exemplary embodiment, the electronic device 300 may include an ElectroMagnetic Resonance (EMR) sensor pad that detects the location of the electronic pen 320 using electromagnetic induction. According to one exemplary embodiment, the EMR sensor pad may include a plurality of conductive patterns. According to one exemplary embodiment, the electronic device 300 may supply power to the conductive pattern to form an electromagnetic field. When the electronic pen 320 is brought into contact with the display 301 or is hovered within a specific distance of the display 301, the EMR sensor may detect the location of the electronic pen 320 by receiving a feedback signal at a resonance frequency of the coil 323. The coil 323 generates the feedback signal due to the electromagnetic field.

According to one exemplary embodiment, the electronic device 300 may include a detecting member for detecting the feedback signal at the resonance frequency of the coil 323 when the electronic pen 320 is fully inserted into the pen placing space 311. According to one exemplary embodiment, the detecting member may use the resonance frequency of the coil 323 as a detecting means for detecting whether the electronic pen 320 is inserted. According to one exemplary embodiment, the electronic device may use the feedback signal of the coil 323 detected by the detecting member to confirm whether the electronic pen 320 is inserted into the pen placing space 311 of the electronic device 300.

Figure 4:
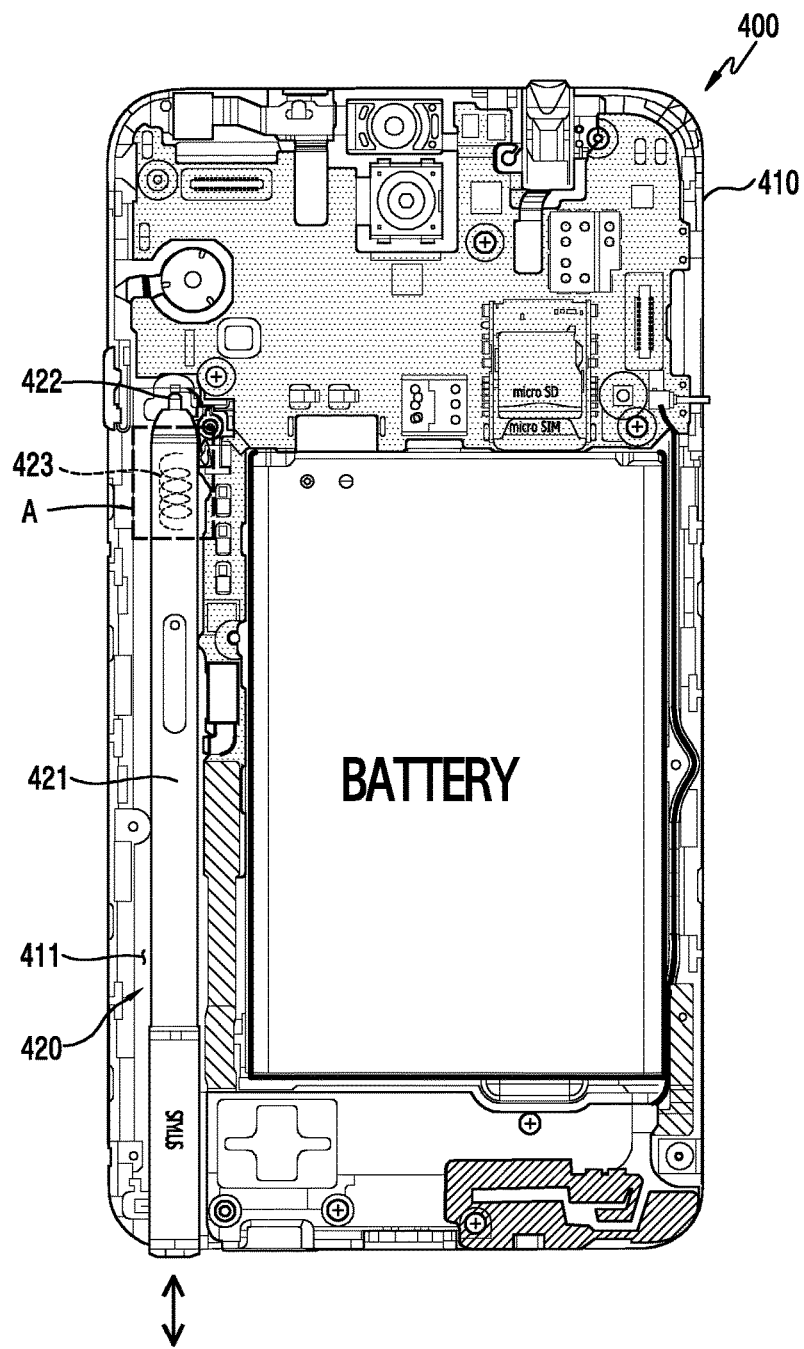
FIG. 4 is a bottom view of an electronic device illustrating a location of a detecting member according to one exemplary embodiment of the present disclosure.

FIG. 4 is a bottom view of an electronic device illustrating a location of a detecting member according to one exemplary embodiment of the present disclosure.

An electronic device 400 including an electronic pen 420 of FIG. 4 may be similar to the electronic device 300 of FIG. 3A and FIG. 3B, or may be another example of the electronic device.

Referring to FIG. 4, the housing 410 of the electronic device 400 may include a pen placing space 411 for accommodating the electronic pen 420. According to one exemplary embodiment, the electronic pen 420 may include a pen housing 421 and a tip 422 at an end portion thereof, and may include a coil 423 therein. According to one exemplary embodiment, the detecting member of electronic device 400 is disposed in an inner area (e.g., the area A of FIG. 4) of the electronic device 400 which overlaps with the coil 423 when the electronic pen 420 is fully inserted into the pen placing space 411 of the housing 410. The detecting member may receive a feedback signal at the resonance frequency of the coil 423 through the area A. Therefore, to prevent interference, portions of other components of the electronic device 400 that overlap with the area A may be made of non-conductive materials.

According to one exemplary embodiment, the housing 410 of the electronic device 400 may be metallic. The area of the housing 410 corresponding to the area A may be made of a non-conductive material, e.g. non-metallic. According to one exemplary embodiment, the area of the housing 410 corresponding to area A may be a non-conductive member (e.g., PolyCarbonate (PC)) which is double-injected or insert-molded with the rest of the housing 410. According to one exemplary embodiment, when at least one metal bracket is placed between the pen placing space 411 of the housing 410 and the detecting member, the area of the bracket corresponding to the area A may also be a non-conductive member having the aforementioned structure. However, the present disclosure is not limited thereto. For example, an overlapping area of a component corresponding to the area A may also be an opening.

According to one exemplary embodiments, when a neighboring area overlapping with the area A is made of a metal member (e.g., a metal housing, a metal bracket, etc.), a shielding member may be disposed to an overlapping area between the metal member and the coil to prevent distortion for the resonance frequency of the coil of the electronic pen. According to one exemplary embodiment, the shielding member may be a frequency adjusting member for correcting the resonance frequency generated in the electronic pen to a desired resonance frequency. According to one exemplary embodiment, the frequency adjusting member may be made of a soft magnetic material.

According to one exemplary embodiment, the detecting member may be configured to transmit a signal at a Tx frequency, where the particular Tx frequency is set in consideration of the surrounding environment of the pen placing space. The detecting member may further receive a feedback signal generated by the coil 423 at a Rx at the resonance frequency.

Figure 5:
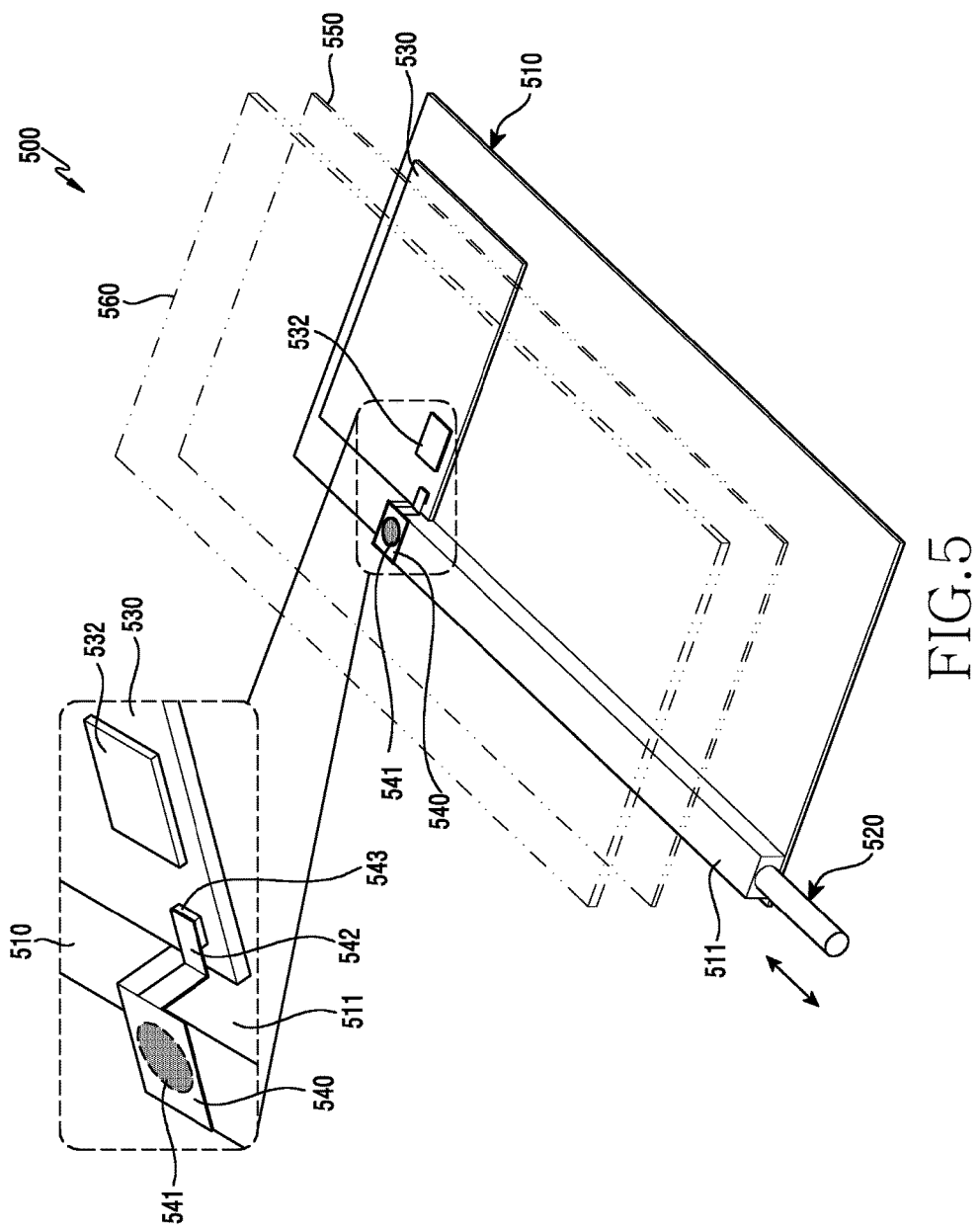
FIG. 5 is a perspective view of a detecting member of an electronic device according to one exemplary embodiment of the present disclosure.

FIG. 5 is a perspective view of a detecting member of an electronic device according to one exemplary embodiment of the present disclosure.

The electronic device 500 including the electronic pen 520 of FIG. 5 may be similar to the electronic device 300 of FIG. 3A and FIG. 3B or the electronic device 400 of FIG. 4, or may be another example of the electronic device.

Referring to FIG. 5, the electronic device 500 may include a housing 510 having a pen placing space 511. According to one exemplary embodiment, a substrate 530 (e.g., PCB, FPCB, etc.) may be disposed on the housing 510. The housing 510 may include the pen placing space 511 in which the electronic pen 520 can be inserted. According to one exemplary embodiment, the electronic device 500 may include an EMR sensor pad 550 and a display module 560 which are sequentially stacked on the housing 510. The EMR sensor pad 550 may be configured to induce a feedback signal at the resonance frequency of a coil included in the electronic pen 520 and subsequently receive the feedback signal. Although in this embodiment the EMR sensor pad 550 is disposed between the display module 560 and the housing 510, the present disclosure is not so limited.

According to one exemplary embodiment, the electronic device 500 may include a detecting member 540 disposed in an area overlapping with the coil of the electronic pen 520 when the electronic pen 520 is fully placed in the pen placing space 511. According to one exemplary embodiment, the detecting member 540 may be disposed at a location spaced apart from the substrate 530 by a specific interval, and may be electrically connected to the substrate 530 through a connector 543, which may be a Flexible Printed Circuit Board (FPCB) 542. The detecting member 540 may be disposed inside or outside the pen placing space 511. When the electronic pen 520 is inserted into the pen placing space 511, the detecting member 540 overlaps with the coil of the electronic pen 520. According to one exemplary embodiment, the detecting member 540 may include a conductive pattern 541 that allows it to recognize the insertion of the electronic pen 520. According to one exemplary embodiment, the detecting member 540 may be configured so that the conductive pattern 541 is formed on the FPBC. According to one exemplary embodiment, the conductive pattern 541 may be a coil loop which is wound several times in a spiral or solenoid manner.

According to one exemplary embodiment, a control circuit 532 may be mounted on the substrate 530. The control circuit 532 may process the feedback signal received by the detecting member 540 depending on whether the electronic pen 520 is inserted. However, the present disclosure is not limited thereto, and thus the feedback signal received by the EMR sensor pad 550 and the feedback signal received the detecting member 540 may be processed together by the control circuit 532.

Figure 6A:
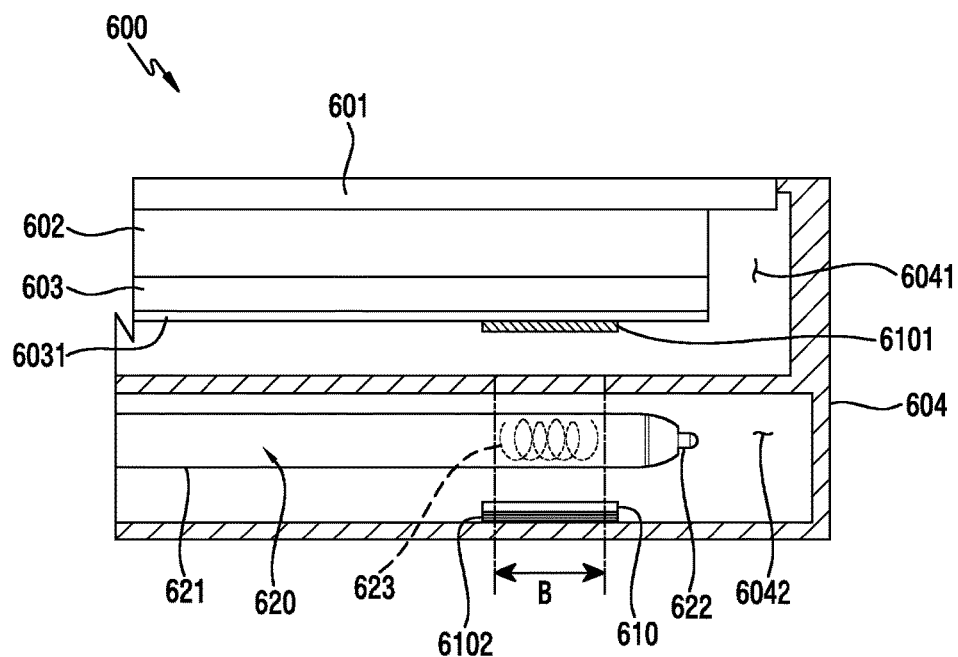
FIG. 6A, FIG. 6B and FIG. 6C are cross-sectional views of electronic devices including electronic pens according to various exemplary embodiments of the present disclosure.
Figure 6B:
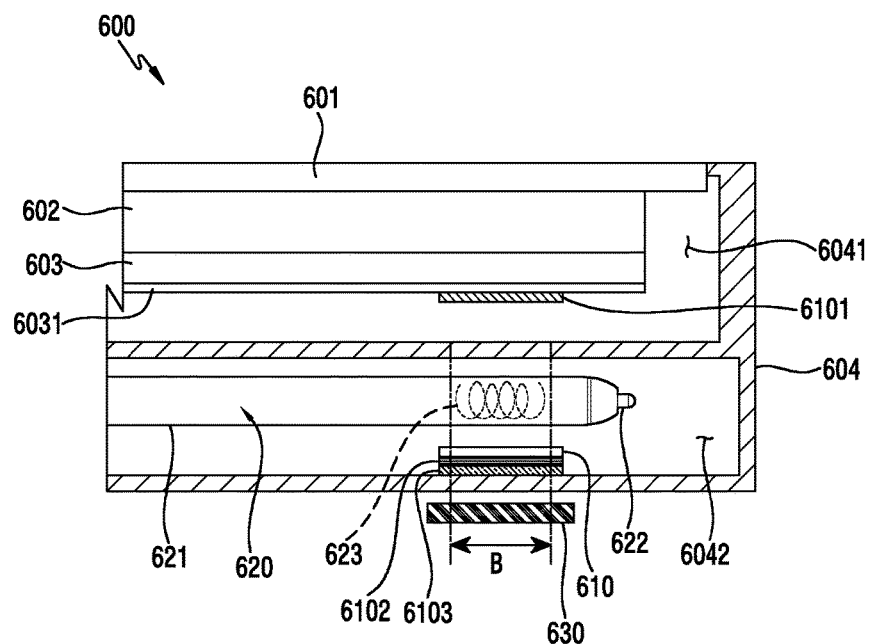
Figure 6C:
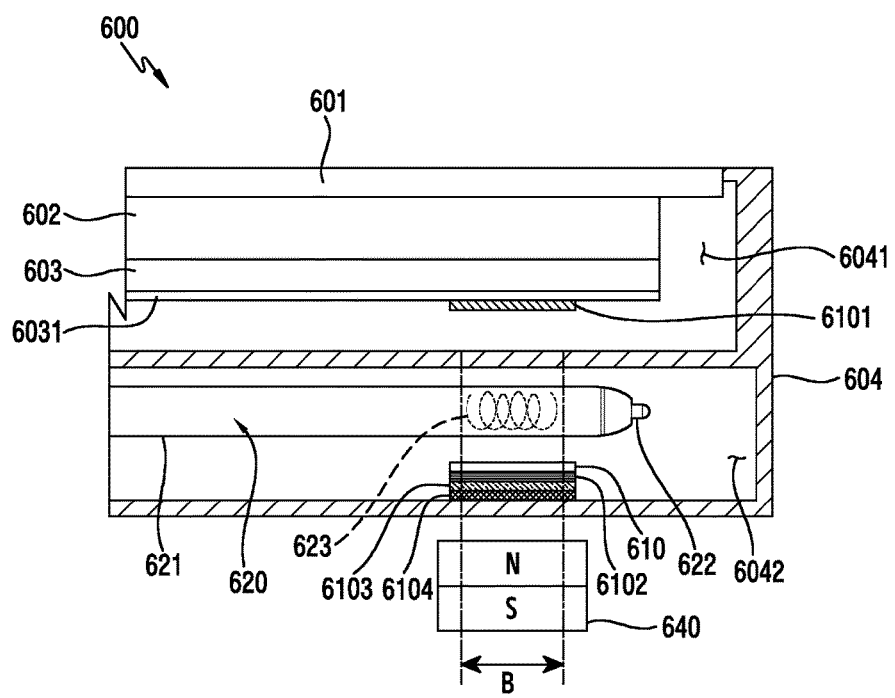

FIG. 6A to FIG. 6C are cross-sectional views of electronic devices including electronic pens according to various exemplary embodiments of the present disclosure.

The electronic device 600 including the electronic pen 620 of FIG. 6A may be similar to the electronic device 300 of FIG. 3A and FIG. 3B, the electronic device 400 of FIG. 4, or the electronic device 500 of FIG. 5, or may be another example of the electronic device.

Referring to FIG. 6A, the electronic device 600 may include a housing 604. According to one exemplary embodiment, the housing 604 may include an electronic component placing space 6041 and a pen placing space 6042 spaced apart from the electronic component placing space 6041. According to one exemplary embodiment, the electronic component placing space 6041 may contain various internal electronic components of the electronic device 600. For example, the electronic component placing space may contain a display module 602 and an EMR sensor pad 603 which are sequentially stacked below the window 601. According to one exemplary embodiment, the display module 602 and the EMR sensor pad 603 may be attached to each other by means of an adhesive member (e.g., OCA or PSA). The display module 602 may include a touch sensor. According to one exemplary embodiment, the touch sensor may be a capacitive-type touch sensor. According to another exemplary embodiment, the display module 602 may include a touch sensor and/or a force sensor responsive to touch pressure. According to one exemplary embodiment, a first conductive shielding member 6031 may be stacked below the EMR sensor pad 603. The first conductive shielding member 6031 shields noise generated from electronic components disposed in a vicinity of the first conductive shielding member 6031 and/or to dissipate heat emitted from those components. The first conductive shielding member 6031 may be made of copper or other metals.

According to one exemplary embodiment, the EMR sensor pad 603 may include a sensor member (not shown) that has a plurality of conductive patterns (e.g., an X-axis coil array and a Y-axis coil array) and a shielding member (not shown) for preventing sensing errors caused by components which may be disposed below the sensor member. According to one exemplary embodiment, the EMR sensor pad 603 may generate an electromagnetic field by receiving power under the control of the processor (e.g., the processor 210) of the electronic device 600, and may detect an input location of the electronic pen 620 by receiving the feedback signal generated by the resonance of the coil 623 in the electronic pen 620.

According to one exemplary embodiment, the pen placing space 6042 of the housing 604 may accommodate the electronic pen 620 when it is inserted into the pen placing space 6042. According to one exemplary embodiment, the electronic pen 620 may include the coil 623 disposed inside the hollow pen housing 621 and a tip 622. According to one exemplary embodiment, in response to the electromagnetic field generated by the EMR sensor pad 603 described above, the coil 623 of the electronic pen 620 generates a feedback signal at a resonance frequency of the coil 623. When the EMR sensor pad 603 detects the feedback signal, the input location of the electronic pen 620 may be detected by the electronic device 600.

According to one exemplary embodiments, the electronic device 600 may further include a detecting member 610 disposed within an area (area B) that at least partially overlaps with the coil 623 when the electronic pen 620 is fully inserted into the pen placing space 6042 of the housing 604. According to one exemplary embodiment, as shown in FIG. 5, the detecting member 610 may include a conductive pattern (541 of FIG. 5), and may be electrically connected to a control circuit (532 of FIG. 5) mounted on a substrate (530 of FIG. 5).

According to various exemplary embodiments, the detecting member 610 may be disposed at various locations overlapping with the area B within the pen placing space 6042 of the housing 604. As illustrated in FIG. 6A, the detecting member 610 is disposed within the pen placing space 6042. However, the present disclosure is not so limited. For example, the detecting member 610 may be disposed at various locations within the housing 604, as long as the detecting member at least partially overlapping with the area B. According to one exemplary embodiment, a non-conductive member (e.g., a non-metallic member) may be disposed to overlap with the area B. Therefore, the detecting member 610 may detect the feedback signal from the coil 623 without interference.

According to one exemplary embodiment, at least one shielding members 6101 and 6102 may be disposed to overlap with the area B. According to one exemplary embodiment, the first shielding member 6101 may be disposed above the coil 623 and below the first conductive shielding member 6031. The second shielding member 6102 may be disposed below the detecting member 610. According to other exemplary embodiments, the first shielding member 6101 and the second shielding member 6102 may be disposed at various locations, as long as they at least partially overlap with the area B. According to one exemplary embodiment, the first shielding member 6101 and the second shielding member 6102 may be disposed within the housing 604 to shield the resonance environment of the pen mounting place 6042 from other objects (e.g., conductive components, magnetic substances, electric components, etc.) in the housing 604. According to one exemplary embodiment, the first shielding member 6101 and the second shielding member 6102 may be made of a soft magnetic material. The first shielding member 6101 and the second shielding member 6102 may be made of the same soft magnetic material or be made of soft magnetic materials having different properties.

FIG. 6B illustrates a configuration of the electronic device similar to that of FIG. 6A, but additionally has structures for preventing the resonance environment of the pen placing space 6042 from being disturbed by an external conductor 630.

According to one exemplary embodiment, ElectroMagnetic (EM) noise may be introduced by a conductor 630 hovered outside the housing 604. The EM noise may change the resonance environment of the pen placing space 6042. When this happens, the resonance frequency of the coil 623 may change from a pre-set frequency band to another band. This may cause erroneous operations. For example, the detecting member 610 may not be able to detect the feedback signal because it is only configured to detect signals in the pre-set frequency band. According to one exemplary embodiment, the electronic device 600 may include a second conductive shielding member 6103 overlapping with the area B to shield the EM noise from the resonance environment of the pen placing space 6042. According to one exemplary embodiment, the second conductive shielding member 6103 may be disposed below the second shielding member 6102 so that it is between the second conductive shielding member 6103 and the wall of the housing 604. The second shielding member 6102 may shield the resonance environment of the pen placing space so that it is not affected by objects inside and outside the housing. The second conductive shielding member 6103 may shield the resonance environment of the pen placing space so that it is not affected by noise caused by the conductor 630. According to one exemplary embodiment, the second conductive shielding member 6103 may be made of aluminum. For example, the second conductive shielding member 6103 may be an aluminum sheet or aluminum film.

FIG. 6C illustrates a configuration of the electronic device similar to that of FIG. 6B, but additionally has structures for preventing the resonance environment of the pen placing space 6042 from being disturbed by an external magnetic material.

According to one exemplary embodiment, the magnetic noise generated by the external magnetic material 640 may not be completely shielded by the second shielding member 6102. This may lead to an attenuation of the feedback signal generated by the coil 623. According to one exemplary embodiment, the electronic device 600 may include a third shielding member 6104 that overlap with the area B. According to one exemplary embodiment, the third shielding member 6104 may be disposed below the second conductive shielding member 6103 so that the third shielding member 6104 is between the second conductive shielding member 6103 and the wall of the housing 604. According to one exemplary embodiment, the third shielding member 6104 may prevent the feedback signal at the resonance frequency of the coil 623 from being attenuated by the magnetic material 640 outside of the electronic device 600. According to one exemplary embodiment, the third shielding member 6104 may be made of a soft magnetic material. The third shielding member 6104 may be made of a soft magnetic material that is the same as or different from the soft magnetic material used for the first shielding member 6101 and/or the second shielding member 6102.

Figure 6D:
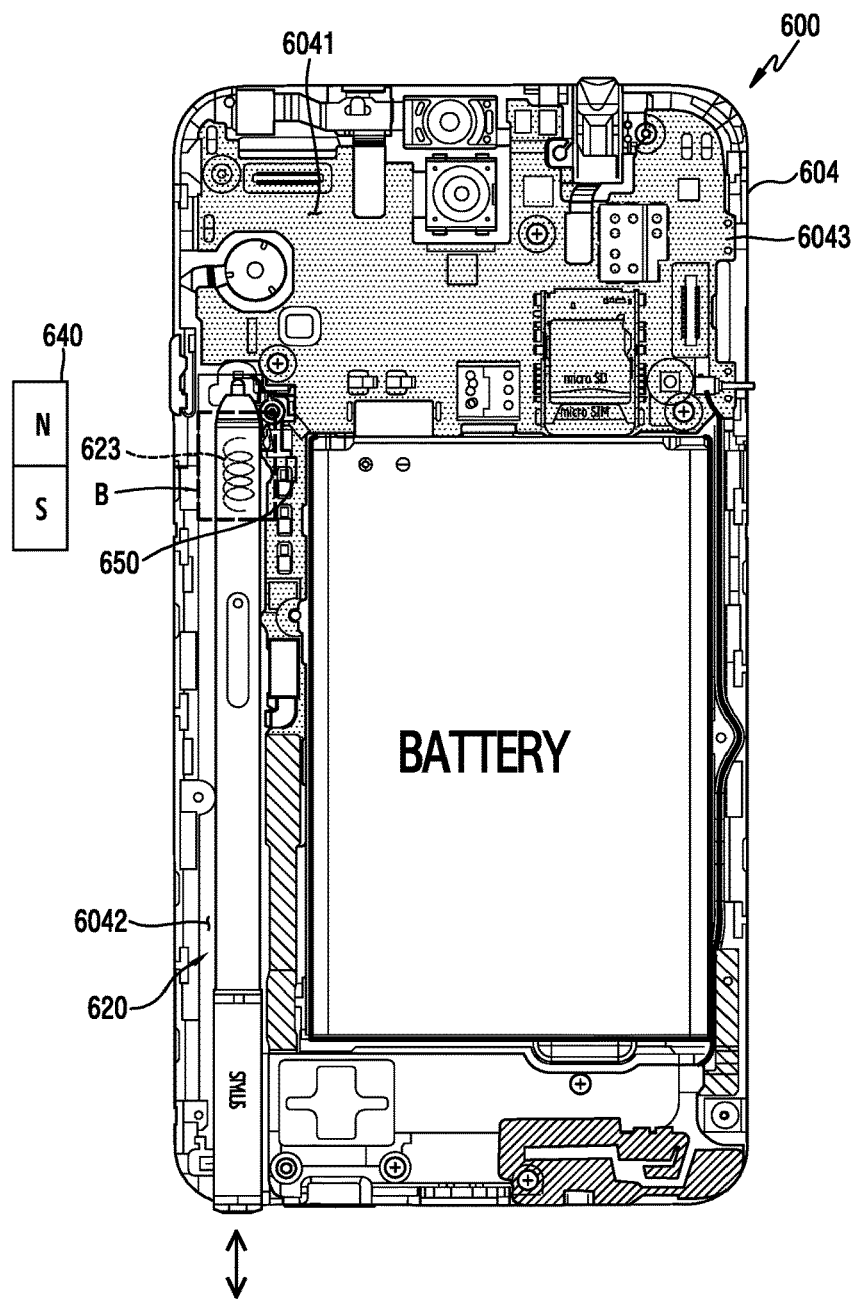
FIG. 6D is a bottom view of an electronic device including a magnetic force sensor according to one exemplary embodiment of the present disclosure.

FIG. 6D is a bottom view of an electronic device including a magnetic force sensor according to one exemplary embodiment of the present disclosure.

Referring to 6D, according to one exemplary embodiment, if an external magnet is present in the vicinity of the area B to which a detecting member (610 of FIG. 6A) is disposed, the electronic device 600 may include a magnetic force detecting sensor 650 (e.g., a hall sensor or a magnetic reed switch) capable of detecting this. According to one exemplary embodiment, the magnetic force detecting sensor 650 may be disposed to be mounted on a substrate 6043 disposed in the component placing space 6041 of the housing. However, the present disclosure is not so limited, and thus the magnetic force detecting sensor 650 may be disposed elsewhere within the housing 604. According to one exemplary embodiment, since the magnetic force detecting sensor 650 is configured to detect hovering of the magnet 640, the electronic device 600 may determine whether the feedback signal from the coil 623 may be attenuated. According to one exemplary embodiment, when the magnet 640 is detected be the magnetic force detecting sensor 650, the electronic device 600 may output notification information informing the user. In another embodiment, upon detecting the magnet 640 in the vicinity of the electronic device 600, the electronic device 600 may change the intensity of the signal at the Tx frequency outputted by the detecting member 610.

Figure 7A:
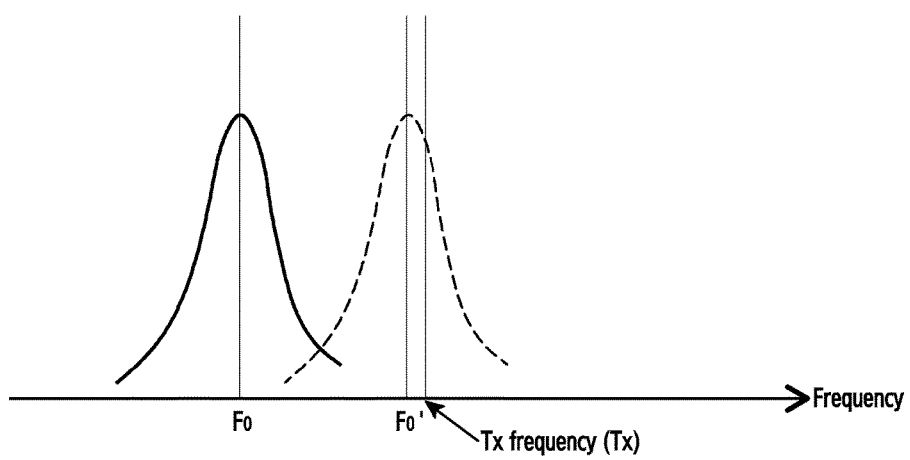
FIG. 7A is a graph illustrating signals outputted by an electronic pen at various resonance frequencies when the electronic pen is in different resonance environments, according to one exemplary embodiment of the present disclosure.

FIG. 7A is a graph illustrating signals outputted by an electronic pen at various resonance frequencies when the electronic pen is in different resonance environments, according to one exemplary embodiment of the present disclosure.

Referring to FIG. 6A and FIG. 7A, the electronic pen 620 may generate a feedback signal at the resonance frequency $F_0$ when it is subject to the electromagnetic field generated by the EMR sensor, i.e. when the electronic pen 620 is outside the electronic device 600. The electronic pen 620 may then generate a feedback signal at the resonance frequency $F_{0'}$ when the electronic pen 620 is in the resonance environment of the pen placing space 6042. According to one exemplary embodiment, when the electronic pen 620 is inserted into the pen placing space 6042, the detecting member 610 may transmit a signal at the Tx frequency, which is at a frequency corresponding to the resonance frequency $F_{0'}$, and may detect the feedback signal Rx from the electronic pen 620. According to one exemplary embodiment, the Tx frequency may be set to a frequency equal to the resonance frequency $F_{0'}$ or near the resonance frequency $F_{0'}$. For example, if the resonance frequency of the electronic pen is changed to 600 KHz due to being in the pen placing space, the Tx frequency may be 590 KHz or 620 KHz.

Figure 7B:
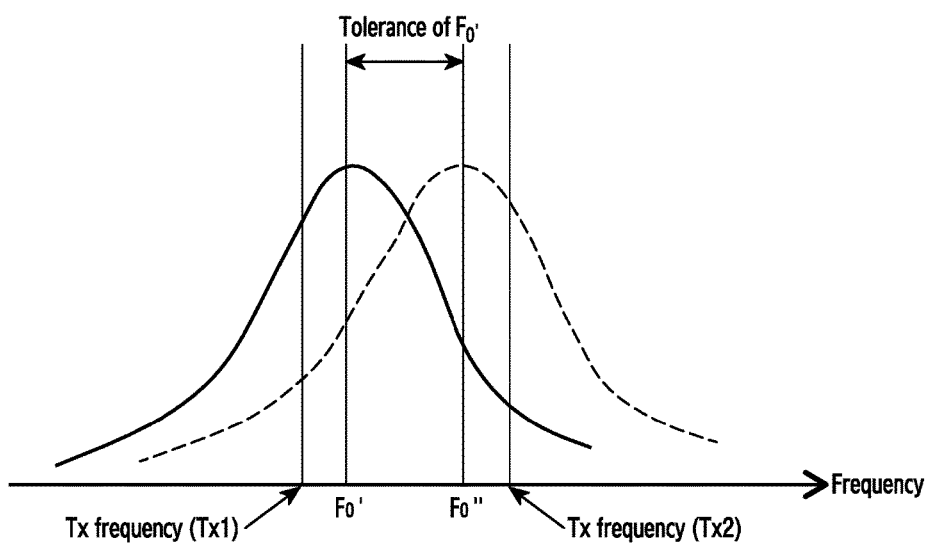
FIG. 7B is a graph illustrating feedback signals at various resonance frequencies outputted by an electronic pen according to one exemplary embodiment of the present disclosure.

FIG. 7B is a graph illustrating feedback signals at various resonance frequencies outputted by an electronic pen, according to one exemplary embodiment of the present disclosure.

Referring to FIG. 6A and FIG. 7B, the detecting member 610 may transmit at least two Tx frequencies to detect feedback signal from the electronic pen 620 at various resonance frequencies when the electronic pen 620 is in the resonance environment of the pen placing space 6042. According to one exemplary embodiment, the coil 623 of the electronic pen 620, when the pen is inserted into the pen placing space 6042, may generate a feedback signal at a resonance frequency having a specific tolerance due to design tolerances (e.g., tolerances between the coil and the pen placing space) of the pen placing space 6042. According to one exemplary embodiment, the detecting member 610 may transmit at least two different Tx frequencies to cover all resonance frequencies of the coil 623 having such a tolerance. According to one exemplary embodiment, when the coil 623 of the electronic pen 620 has a tolerance between the resonance frequency $F_{0'}$ and the resonance frequency $F_{0''}$, the detecting member 610 may transmit the Tx frequency Tx1 and the Tx frequency Tx2. For example, in a case where the resonance frequency of the electronic pen 620 is generated at the frequency band of 600~620 KHz due to the aforementioned tolerance, erroneous operations caused by such a tolerance may be avoided when the Tx frequency Tx1 is set at 590 KHz and Tx frequency Tx2 is set at 620 KHz.

Figure 7C:
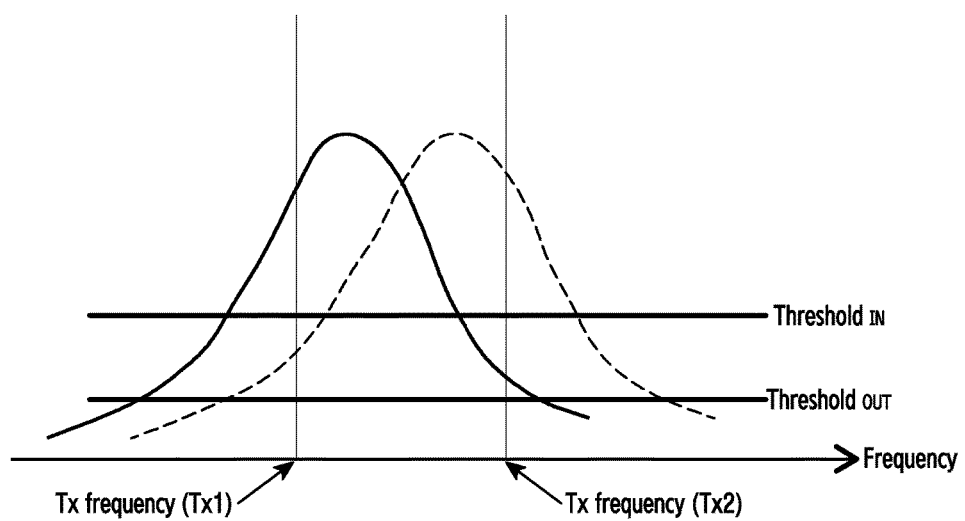
FIG. 7C is a graph illustrating recognition of an insertion and separation of an electronic pen according to one exemplary embodiment of the present disclosure.

FIG. 7C is a graph illustrating recognition of an insertion and separation of an electronic pen according to one exemplary embodiment of the present disclosure.

Referring to FIG. 6A and FIG. 7C, the electronic device 600 may determine whether the electronic pen 620 is inserted into the pen placing space 6042 using the detected Rx signal strength. According to one exemplary embodiment, when the detecting member 610 may periodically scan for the coil 623. According to one exemplary embodiment, the scanning period of the detecting member 610 may be set at a frequency lower than the scanning period for detecting input locations by the EMR sensor pad 603. This may be done in order to preserve battery power of the electronic device. According to one exemplary embodiment, the electronic device 600 may determine whether the feedback signal Rx received from the coil 623 exceeds a pre-set threshold. A $Threshold_{IN}$ may be set for identifying the insertion of the electronic pen 620 and a $Threshold_{OUT}$ may be set for identifying the removal of the pen from the pen placing space 6042. For example, when a signal at a particular Tx frequency is used by the detecting member 610, the electronic device 600 may recognize that the electronic pen 620 is inserted into the pen placing space 6042 if the strength of the Rx signal at the corresponding frequency is greater than $Threshold_{IN}$. Conversely, the electronic device 600 may recognize that the electronic pen 620 is removed if the strength of the Rx signal is less than $Threshold_{OUT}$. According to one exemplary embodiment, when two Tx frequencies are used, the electronic device 600 may recognize that the electronic pen 620 is inserted into the pen placing space 6042 if any one of feedback Rx signals (Rx signals corresponding to Tx1 and Tx2 frequencies) is greater than Threshold$_{IN}$, and may recognize that the electronic pen 620 is removed if both Rx signals are less than Threshold$_{OUT}$.

Therefore, according to one exemplary embodiment, even if one feedback signal is attenuated at a specific frequency, other signals may still be detected to be greater than the threshold because a plurality of Tx frequencies and a plurality of thresholds are used. Therefore, errors caused by tolerances in the resonance frequencies may be avoided.

According to one exemplary embodiment, when an Rx signal is located between different thresholds, the electronic device 600 may determine that the electronic pen 620 is not fully inserted and thus may output notification information for this. According to one exemplary embodiment, the notification information may include a visual output through a display, a tactile output through a vibrator, or an audible output through a speaker device.

Figure 8:
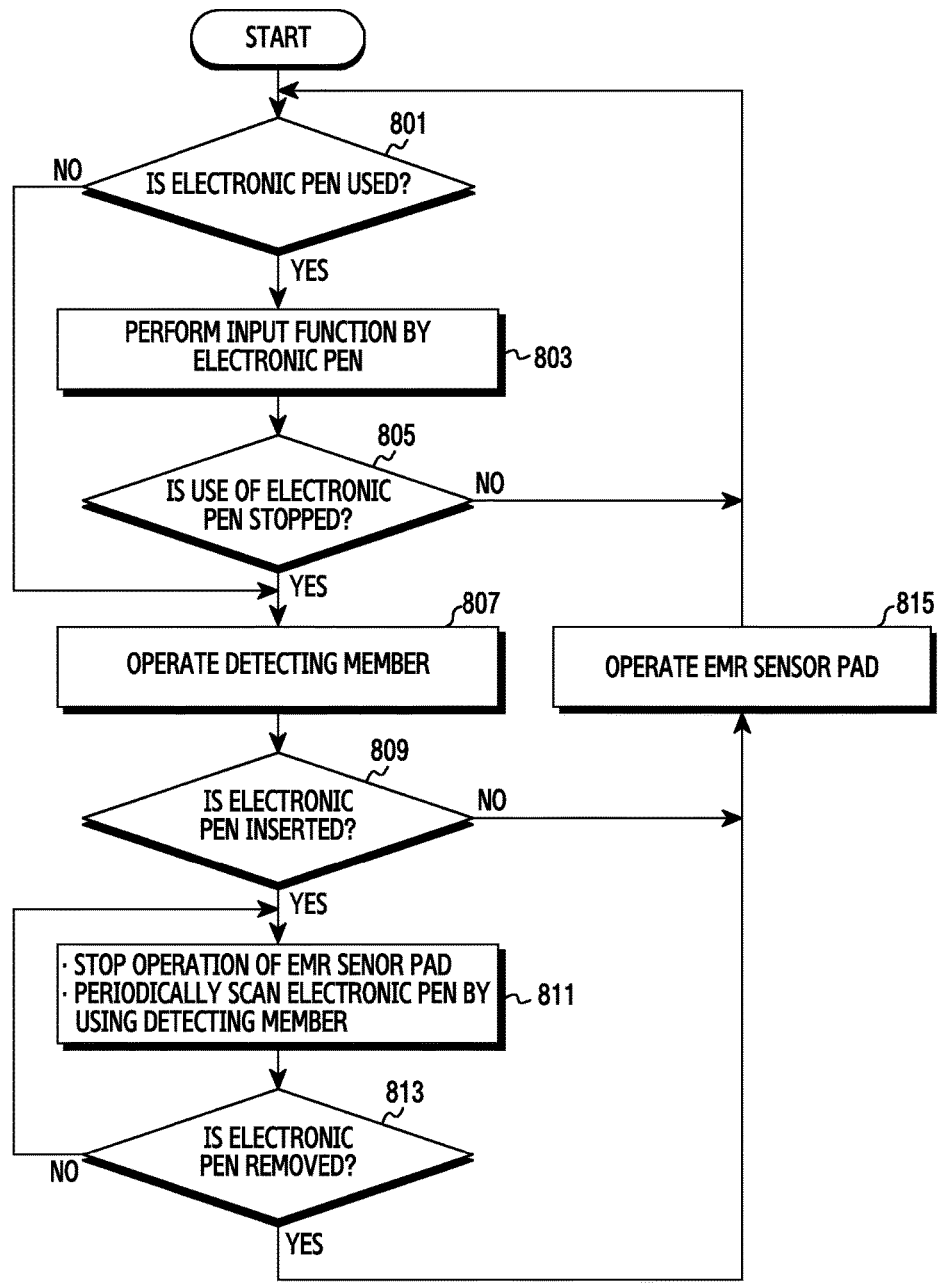
FIG. 8 is a flowchart for detecting whether an electronic pen is inserted into the electronic device according to one exemplary embodiment of the present disclosure.

FIG. 8 is a flowchart for detecting whether an electronic pen is inserted into the electronic device according to one exemplary embodiment of the present disclosure.

The description of FIG. 8 may be based on FIG. 6A to FIG. 6C.

Referring to FIG. 8, in operation 801, the electronic device 600 may perform an operation of detecting whether the electronic pen 620 is being used. According to one exemplary embodiment, the electronic device 600 may detect whether the electronic pen 620 is detached from the pen placing space 6042 of the electronic device and may detect whether an input function is performed via a display of the electronic device.

In operation 803, upon detecting that the electronic pen 620 is being used for the input function, the electronic device may perform the input function. According to one exemplary embodiment, in this case, the electronic device may detect a data input of the electronic pen 620 by receiving a feedback signal from the coil 623 of the electronic pen 620 via the ElectroMagnetic Resonance (EMR) sensor pad 603. According to one exemplary embodiment, the electronic device 600 may detect a location at which the electronic pen 620 is directly in contact with the display of the electronic device 600 or is hovered within a specific distance. Upon detecting that the electronic pen 620 is being used for the input function, the detecting member 610 may not operate or may operate at a reduced scanning period to preserve power.

In operation 805, the electronic device may perform an operation of detecting whether the use of the electronic pen 620 is stopped. According to one exemplary embodiment, if the input from the electronic pen 620 is not detected after a specific time interval, the electronic device may determine that the use of the electronic pen 620 is stopped.

Upon determining that the use of the electronic pen 620 has been stopped in operation 805, the electronic device may perform operation 807. In one embodiment, in operation 807, the electronic device may initiate the operation of the detecting member 610. According to one exemplary embodiment, the detecting member 610 and the EMR sensor pad 603 may be separate components. When the detecting member 610 operates, it may periodically scan for whether the coil 623 of the electronic pen 620. According to one exemplary embodiment, the scanning period of the detecting member 610 may be set to a frequency lower than the scanning period for detecting data input by the EMR sensor pad 603 to decrease power consumption of the electronic device.

In operation 809, the electronic device 600 may perform an operation of detecting whether the electronic pen 620 is inserted. According to one exemplary embodiment, the electronic device 600 may detect whether the electronic pen 620 is fully inserted into the pen placing space 6042 of the housing. To do this, the detecting member 610 may transmit a Tx frequency Tx1 and receive a feedback signal Rx corresponding to the resonance frequency of the coil 623. According to one exemplary embodiment, a resonance frequency provided from the coil of the electronic pen 620 may be detected by a control circuit (532 of FIG. 5) (e.g., a driver IC) mounted on the substrate (530 of FIG. 5), and a detected signal may be provided to the electronic device (e.g., the processor).

Upon determining that the electronic pen 620 is inserted in operation 809, the electronic device 600 may perform operation 811. In operation 811, the electronic device 600 may stop the operation of the EMR sensor pad 603, and may periodically scan the electronic pen 620 via the detecting member 610. According to one exemplary embodiment, upon detecting that the electronic pen 620 is inserted into the pen placing space 6042 of the housing 604, power consumption may be reduced because the EMR sensor pad 603 stopped its operation or had its scanning period reduced.

In operation 813, the electronic device 600 may perform an operation for detecting whether the electronic pen 620 has been removed from the pen placing space 6042 (i.e. whether the electronic pen detached from the electronic device). According to one exemplary embodiment, the detecting member 610 performs the scanning operation at a predetermined scanning frequency.

Upon determining that the electronic pen 620 is removed from the pen placing space 6042, the electronic device may operate the EMR sensor pad 603 again in operation 815. According to one exemplary embodiment, when the electronic pen 620 is removed from the pen placing space 6042, the electronic device 600 may determine that data input function can be performed by the electronic pen 620, and thus may operate the EMR sensor pad 603.

If the input function of the electronic pen 620 is not performed even after a predetermined time has elapsed in operation 801, the electronic device 600 may determine that the use of the electronic pen 620 is stopped, and proceeding to operation 807 to operate the detecting member 610.

According to one exemplary embodiment, the electronic device 600 may detect that the electronic pen 620 is inserted into the pen placing space 6042 and stop the operation of the EMR sensor pad 603 when it is inserted, thereby reducing power consumption. According to one exemplary embodiment, the electronic device 600 may stop the operation of the detecting member 610 when the electronic pen 620 is used to reduce power consumption.

According to various exemplary embodiments of the present disclosure, whether an electronic pen is inserted can be detected by using the existing electronic components or by using components that take up minimal amount of space within the housing of the electronic device. Accordingly, the electronic device according to the present disclosure may be made to be compact. The present disclosure also allows for reduced power consumption by the electronic device and, and saves manufacturing costs for the electronic device.

According to one exemplary embodiment, an electronic device may include a housing having a first side and an opposite second side, a display disposed between the first side and the second side, an ElectroMagnetic Resonance (EMR) sensor pad disposed between the display and the second side, a pen placing space disposed between the first side and the second side to accommodate an electronic pen, and a detecting member disposed in vicinity of the electronic pen for detecting the electronic pen when the electronic pen is fully inserted into the pen placing space.

According to one exemplary embodiment, the detecting member may include a conductive pattern, where the conductive pattern is a loop which is wound several times in a spiral or solenoid manner.

According to one exemplary embodiment, the detecting member is disposed in an area at least partially overlapping with a coil provided in the electronic pen, and the area is made of a non-conductive member.

According to one exemplary embodiment, the detecting member may be configured to transmit at least one signal at a Tx frequency, the Tx frequency corresponding to a resonance environment of the pen placing space.

According to one exemplary embodiment, the resonance environment may be changed by a conductor or a magnet disposed in a vicinity of the coil.

According to one exemplary embodiment, the at least one Tx frequency may include a first signal at a first Tx frequency and a second signal at a second Tx frequency, such that the first Tx frequency and the second Tx frequency define a resonance frequency band of the coil.

According to one exemplary embodiment, the detecting member may be disposed in the pen placing space or inside the housing apart from the pen placing space.

According to one exemplary embodiment, the electronic device may further include at least one conductive shielding member disposed in the area at least partially overlapping the coil, and at least one frequency adjusting member overlapping the at least one conductive shielding member.

According to one exemplary embodiment, the at least one frequency adjusting member may include a soft magnetic material and is configured to shield a resonance environment of the pen placing space.

According to one exemplary embodiment, the at least one conductive member may include a metal housing, a metal bracket, or another metallic component of the electronic device.

According to one exemplary embodiment, the electronic device may further include a control circuit configured to process a feedback signal from the coil detected by the detecting member, so as to recognize an insertion of the electronic pen into the pen placing space.

According to one exemplary embodiment, the control circuit may be further configured to process another feedback signal detected by the EMR sensor.

According to one exemplary embodiment, a scanning period of the detecting member may be lower than a scanning period of the EMR sensor pad.

According to one exemplary embodiment, the detecting member may be electrically connected to a Printed Circuit Board (PCB) disposed inside the housing by a Flexible Printed Circuit (FPCB), the FPCB comprising a conductive pattern disposed in the area at least partially overlapping the coil.

According to one exemplary embodiment, a method for recognizing an insertion of an electronic pen into an electronic device having a detecting member for detecting a signal at a resonance frequency from a coil provided in the electronic pen may include detecting whether a data input operation of the electronic pen is stopped, when the data input operation of the electronic pen is stopped, operating the detecting member, detecting the insertion of the electronic pen by the detecting member, when the insertion of the electronic pen is detected, stopping operation of an ElectroMagnetic Resonance (EMR) sensor pad configured to detect the data input operation of the electronic pen, detecting a removal of the electronic pen from the electronic device by the detecting member, and when the removal of the electronic pen is detected, operating the EMR sensor pad again.

According to one exemplary embodiment, the method may further include stopping operation of the detecting member when the data input operation is detected by the EMR sensor pad.

According to one exemplary embodiment, the method may further include, when the insertion of the electronic pen is detected, scanning for the electronic pen periodically by the detecting member.

According to one exemplary embodiment, the detecting member may be configured to transmit at least one signal at a Tx frequency, the Tx frequency corresponding to a resonance environment of the pen placing space.

According to one exemplary embodiment, the at least one signal at the Tx frequency may include a first signal at a first Tx frequency and a second signal at a second Tx frequency, where the first Tx frequency and the second Tx frequency define a resonance frequency band of the coil.

According to one exemplary embodiment, a feedback signal for recognizing the insertion of the electronic pen detected by the detecting member and another feedback signal for the data input operation of the electronic pen detected by the EMR sensor pad may be processed by a control circuit.

Various exemplary embodiments of the present disclosure disclosed in the specification and the drawing are merely specific examples presented for clarity and are not intended to limit the scope of the present disclosure. Therefore, in addition to the embodiments disclosed herein, various changes in forms and details may be made without departing from the present disclosure as defined by the appended claims and their equivalents.

At least certain portions of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:
1. An electronic device comprising:
a housing having a first side and an opposite second side;
a display disposed between the first side and the second side;
an electromagnetic resonance (EMR) sensor pad disposed between the first side and the second side;
a pen placing space disposed between the first side and the second side to accommodate an electronic pen; and a detecting member disposed in vicinity of a coil of the electronic pen for detecting the electronic pen when the electronic pen is fully inserted into the pen placing space, wherein the detecting member scans for the electronic pen periodically, when the insertion of the electronic pen is detected.

2. The electronic device of claim 1, wherein the detecting member comprises a conductive pattern, and wherein the conductive pattern is a loop which is wound several times in a spiral or a solenoid manner.

3. The electronic device of claim 1, wherein the detecting member is disposed in an area at least partially overlapping with the coil of the electronic pen, the area is made of a non-conductive member.

4. The electronic device of claim 1, wherein the detecting member is configured to transmit at least one signal at a Tx frequency, the Tx frequency corresponding to a resonance environment of the pen placing space.

5. The electronic device of claim 4, wherein the resonance environment is changed by a conductor or a magnet disposed in a vicinity of the coil.

6. The electronic device of claim 4, wherein the at least one signal at the Tx frequency comprises a first signal at a first Tx frequency and a second signal at a second Tx frequency, and wherein the first Tx frequency and the second Tx frequency define a resonance frequency band of the coil.

7. The electronic device of claim 1, wherein the detecting member is disposed in the pen placing space or inside the housing apart from the pen placing space.

8. The electronic device of claim 1, further comprising:
at least one conductive shielding member disposed in an area at least partially overlapping the coil; and
at least one frequency adjusting member overlapping the at least one conductive shielding member.

9. The electronic device of claim 8, wherein the at least one frequency adjusting member comprises a soft magnetic material and is configured to shield a resonance environment of the pen placing space.

10. The electronic device of claim 8, wherein the at least one conductive shielding member comprises a metallic sheet and is configured to shield interference caused by a component of the electronic device or a conductor disposed outside the electronic device.

11. The electronic device of claim 1, wherein the electronic device further comprises a control circuit configured to process a feedback signal from the coil detected by the detecting member, so as to recognize an insertion of the electronic pen into the pen placing space.

12. The electronic device of claim 11, wherein the control circuit is further configured to process another feedback signal detected by the EMR sensor.

13. The electronic device of claim 1, wherein a scanning period of the detecting member is lower than a scanning period of the EMR sensor pad.

14. The electronic device of claim 1, wherein the detecting member is electrically connected to a Printed Circuit Board (PCB) disposed inside the housing by a Flexible Printed Circuit (FPCB), the FPCB comprising a conductive pattern disposed in an area at least partially overlapping the coil.

15. A method for recognizing an insertion of an electronic pen into an electronic device having a detecting member for detecting a signal at a resonance frequency from a coil provided in the electronic pen, the method comprising:
detecting whether a data input operation of the electronic pen is stopped;
when the data input operation of the electronic pen is stopped, operating the detecting member;
detecting the insertion of the electronic pen by the detecting member;
when the insertion of the electronic pen is detected, stopping operation of an electromagnetic resonance (EMR) sensor pad configured to detect the data input operation of the electronic pen;
detecting a removal of the electronic pen from the electronic device by the detecting member;
when the removal of the electronic pen is detected, operating the EMR sensor pad again; and
when the insertion of the electronic pen is detected, scanning for the electronic pen periodically by the detecting member.

16. The method of claim 15, further comprising stopping operation of the detecting member when the data input operation is detected by the EMR sensor pad.

17. The method of claim 15, wherein the detecting member is configured to transmit at least one signal at a Tx frequency, the Tx frequency corresponding to a resonance environment of the pen placing space.

18. The method of claim 17, wherein the at least one signal at the Tx frequency comprises a first signal at a first Tx frequency and a second signal at a second Tx frequency, and wherein the first Tx frequency and the second Tx frequency define a resonance frequency band of the coil.

19. The method of claim 15, wherein a feedback signal for recognizing the insertion of the electronic pen detected by the detecting member and another feedback signal for the data input operation of the electronic pen detected by the EMR sensor pad are processed by a control circuit.

* * * * *